(12) United States Patent
Wang

(10) Patent No.: US 11,991,455 B2
(45) Date of Patent: *May 21, 2024

(54) LIGHT SENSOR CHIP AND IMAGE PROCESSING DEVICE HAVING DIFFERENT OPERATING MODES

(71) Applicant: PIXART IMAGING INC., Hsin-Chu County (TW)

(72) Inventor: Guo-Zhen Wang, Hsin-Chu County (TW)

(*) Notice: Subject to any disclaimer, the term of this patent is extended or adjusted under 35 U.S.C. 154(b) by 0 days.

This patent is subject to a terminal disclaimer.

(21) Appl. No.: 18/109,861

(22) Filed: Feb. 15, 2023

(65) Prior Publication Data

US 2023/0199320 A1  Jun. 22, 2023

Related U.S. Application Data

(63) Continuation of application No. 17/687,986, filed on Mar. 7, 2022, now Pat. No. 11,611,710, which is a
(Continued)

(51) Int. Cl.
*H04N 23/73* (2023.01)
*G06N 20/00* (2019.01)
(Continued)

(52) U.S. Cl.
CPC .............. *H04N 23/73* (2023.01); *G06T 5/70* (2024.01); *H04N 23/71* (2023.01); *H04N 23/741* (2023.01); *H04N 23/80* (2023.01); *H04N 25/589* (2023.01); *H04N 25/60* (2023.01); *G06N 20/00* (2019.01); *G06T 2207/20182* (2013.01); *H04N 25/76* (2023.01)

(58) Field of Classification Search
CPC ...... H04N 23/73; H04N 23/71; H04N 23/741; H04N 23/80; H04N 25/589; H04N 25/60; H04N 25/76; H04N 23/617; G06T 5/002; G06T 2207/20182; G06T 2207/10144; G06T 2207/20081; G06T 2207/20084; G06T 5/003; G06N 20/00; G06N 3/08
See application file for complete search history.

(56) References Cited

U.S. PATENT DOCUMENTS 10,785,419 B2 * 9/2020 Wang ................ G06T 5/002
2002/0149693 A1 * 10/2002 Tantalo .............. H04N 23/71
348/E5.037
(Continued)

FOREIGN PATENT DOCUMENTS

CN 106534712 A 3/2017

*Primary Examiner* — Timothy J Henn
(74) *Attorney, Agent, or Firm* — Bruce Stone LLP; Joseph A. Bruce

(57) ABSTRACT

There is provided an image processing device including a light sensor and a processor. The light sensor is used to detect light and output an image frame. The processor identifies intensity of ambient light according to an image parameter associated with the image frame. When the ambient light is identified to be strong enough, the processor performs an object identification directly using the image frame. When the ambient light is identified to be not enough, the processor firstly converts the image frame to a converted image using a machine learning model, and then performs the object identification using the converted image.

15 Claims, 4 Drawing Sheets

Related U.S. Application Data continuation of application No. 16/993,433, filed on Aug. 14, 2020, now Pat. No. 11,303,820, which is a continuation of application No. 16/257,277, filed on Jan. 25, 2019, now Pat. No. 10,785,419.

(51) Int. Cl.
  *G06T 5/70* (2024.01)
  *H04N 23/71* (2023.01)
  *H04N 23/741* (2023.01)
  *H04N 23/80* (2023.01)
  *H04N 25/589* (2023.01)
  *H04N 25/60* (2023.01)
  *H04N 25/76* (2023.01)

(56) References Cited

U.S. PATENT DOCUMENTS

| | | | |
|---|---|---|---|
| 2007/0041657 A1* | 2/2007 | Rychagov | G06V 10/993 382/168 |
| 2007/0242936 A1* | 10/2007 | Chujo | G03B 17/00 396/55 |
| 2015/0035985 A1* | 2/2015 | Conneely | H04N 25/61 348/148 |
| 2020/0051260 A1* | 2/2020 | Shen | G06T 5/002 |

* cited by examiner

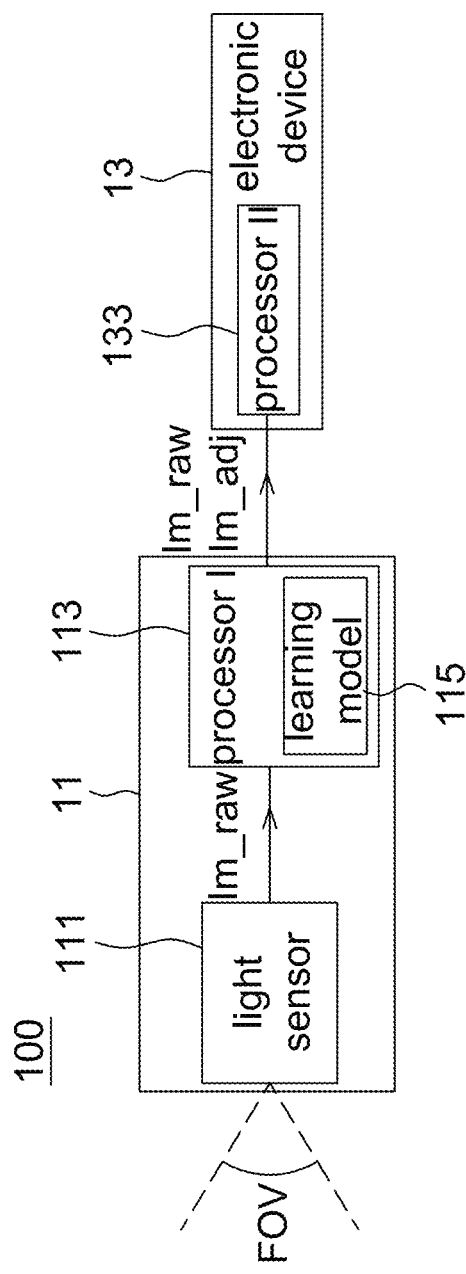
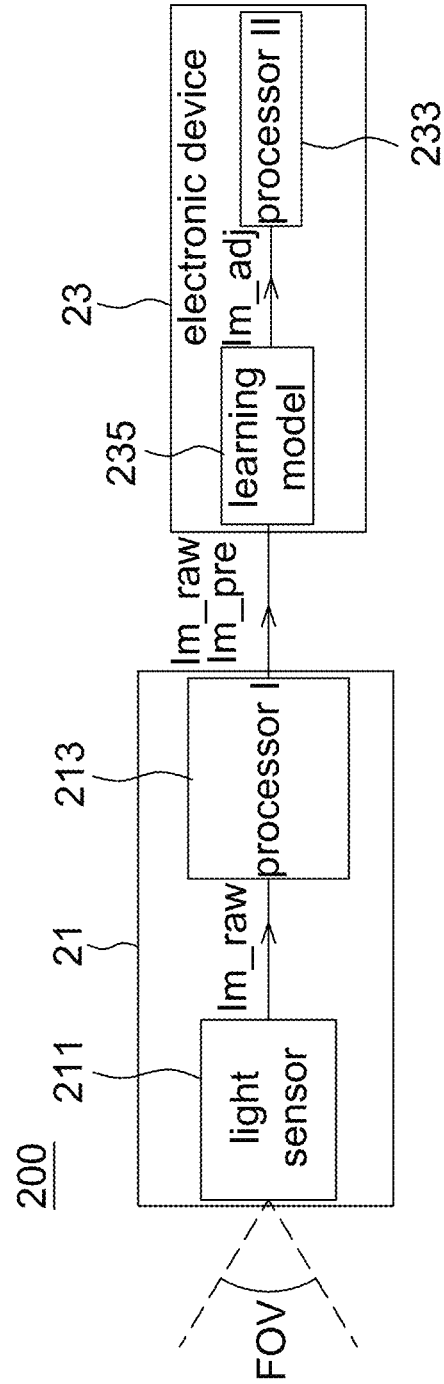
FIG. 1
FIG. 2

LIGHT SENSOR CHIP AND IMAGE PROCESSING DEVICE HAVING DIFFERENT OPERATING MODES

CROSS REFERENCE TO RELATED APPLICATION

The present application is a continuation application of U.S. patent application Ser. No. 17/687,986, filed on Mar. 7, 2022, which is a continuation application of U.S. patent application Ser. No. 16/993,433, filed on Aug. 14, 2020, which is a continuation application of U.S. patent application Ser. No. 16/257,277, filed on Jan. 25, 2019, the disclosures of which are hereby incorporated by reference herein in their entirety.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

BACKGROUND

1. Field of the Disclosure

This disclosure generally relates to an image processing technique and, more particularly, to an image processing device adaptable to low illumination environment and an operating method thereof.

2. Description of the Related Art

The conventional image capturing device generally has an adjustable exposure time. In a strong light environment, the image capturing device acquires an image using a short exposure time. In a weak light environment, the image capturing device acquires an image using a long exposure time so as to increase image features in the captured image such that the object identification can be performed correctly.

However, when this kind of image capturing device is applied to acquire an object image of a moving object in the weak light environment, problems can occur. Because the exposure time is significantly extended, the relative displacement between the moving object and the image capturing device within the extended exposure time can reflect in the acquired image to have blurred object image. More significantly, if this image capturing device is operated in a fast moving scenario, an object image may not even be captured in some images.

Accordingly, it is necessary to provide an image processing device that can acquire valid images even in a weak light environment so as to improve the identification accuracy.

SUMMARY

The present disclosure provides a light sensor chip, an image processing device and an operating method thereof that do not adjust an exposure time of a light sensor from a strong light environment to a weak light environment.

The present disclosure further provides a light sensor chip, an image processing device and an operating method thereof that convert a short exposure image to a quasi-long exposure image using a machine learning model to increase image features in the captured image thereby improving the operating accuracy.

The present disclosure provides a light sensor chip including a light sensor and a processor. The light sensor is configured to detect light using a first exposure time to generate a first image in a first operating mode. The processor is electrically coupled to the light sensor, and configured to control the light sensor to detect light using a second exposure time, longer than the first exposure time, to generate a second image in a second operating mode, and convert, using a pre-stored learning model, the second image into a converted image.

The present disclosure further provides image processing device including a light sensor chip and an electronic device. The light sensor chip is configured to detect light using a first exposure time to output a first image in a first operating mode. The electronic device is coupled to the light sensor chip to receive the first image, and configured to post-process the first image in the first operating mode, control the light sensor chip to detect light using a second exposure time, longer than the first exposure time, to output a second image in a second operating mode, and convert, using a pre-stored learning model, the second image into a converted image, and then post-process the converted image in the second operating mode.

The present disclosure further provides a light sensor chip including a light sensor and a processor. The light sensor is configured to detect light using a first exposure time to generate a first image in a first operating mode. The processor is electrically coupled to the light sensor, and configured to convert the first image into a converted image using a pre-stored learning model, and then output the converted image in the first operating mode, control the light sensor to detect light using a second exposure time, longer than the first exposure time, to generate a second image in a second operating mode, and convert, using the pre-stored learning model, the second image into another converted image, and then output the another converted image in the second operating mode.

In the embodiments of the present disclosure, when the brightness of an output image from a light sensor is identified to be not enough (e.g., according to image gray levels, image quality and/or according to the gain value, exposure time and convergence time of auto exposure of the light sensor), the output image is not directly post-processed but firstly converted to a quasi-long exposure image that contains more image features, and then the quasi-long exposure image is post-processed.

In the embodiments of the present disclosure, the object identification refers to the gesture recognition, distance identification, speed identification, face recognition and depth map construction.

BRIEF DESCRIPTION OF THE DRAWINGS

Other objects, advantages, and novel features of the present disclosure will become more apparent from the following detailed description when taken in conjunction with the accompanying drawings.

FIG. 1 is a block diagram of an image processing device according to a first embodiment of the present disclosure.

FIG. 2 is a block diagram of an image processing device according to a second embodiment of the present disclosure.

DETAILED DESCRIPTION OF THE EMBODIMENT

Figure 3:
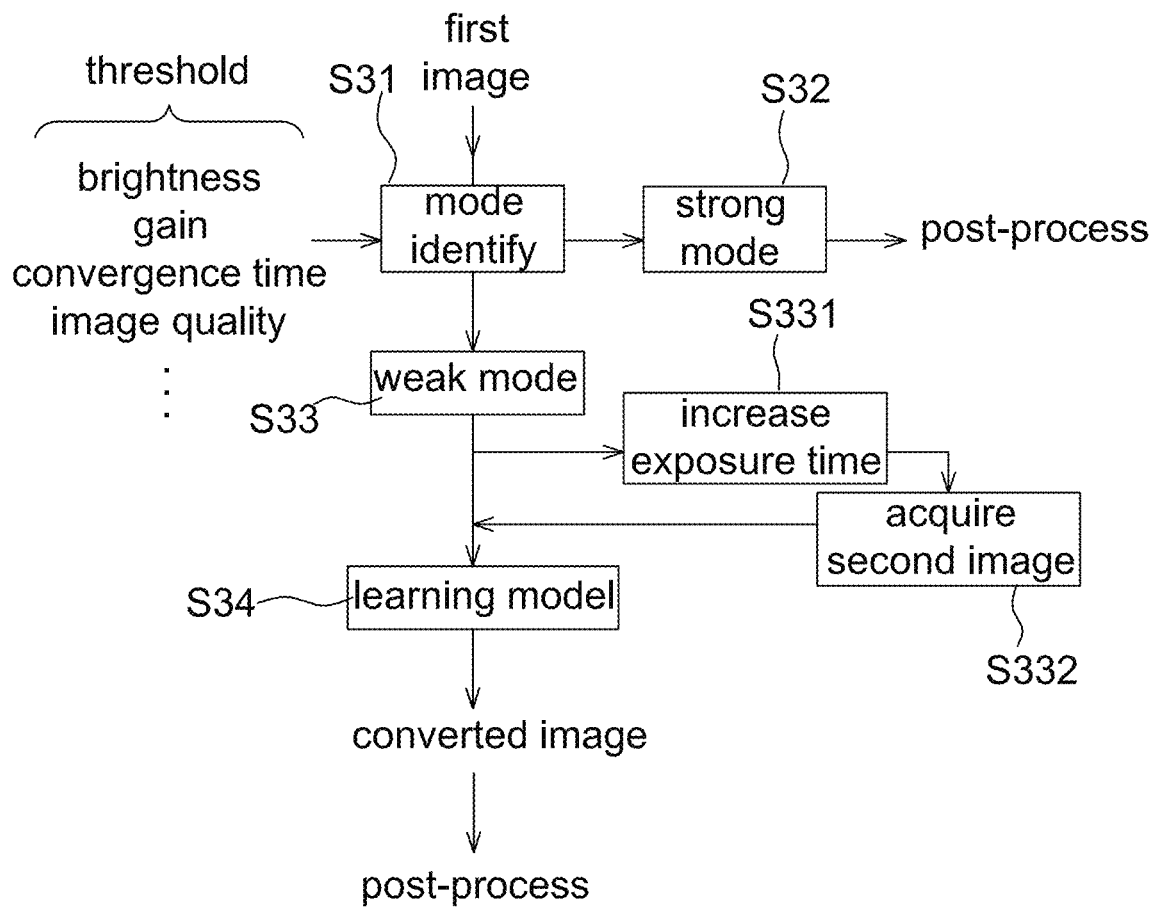
FIG. 3 is a flow chart of an operating method of an image processing device according to one embodiment of the present disclosure.

It should be noted that, wherever possible, the same reference numbers will be used throughout the drawings to refer to the same or like parts.

The light sensor chip, image processing device and an operating method of the present disclosure are adaptable to an electronic device that has a relative displacement with respect to an object, such as a cleaning robot, a self-driving car, a drone, a gesture recognition system, a face recognition device, but not limited to. By keeping the same exposure time or slightly extending the exposure time in a low light environment, the problem of acquiring an invalid image that causes operation error is solved, wherein said invalid image is referred to an image frame containing a blurred object image or missing an object image.

Please referring to FIG. 1, it is a block diagram of an image processing device 100 according to a first embodiment of the present disclosure. The image processing device 100 includes a light sensor chip 11 and an electronic device 13. In one aspect, the light sensor chip 11 is included in the electronic device 13, e.g., the light sensor chip 11 being arranged on a casing of the electronic device 13 to acquire images of external environment. In another aspect, the light sensor chip 11 is coupled to the electronic device 13 via a communication interface to wirelessly transmit an output image to the electronic device 13. As described below, the output image is a raw data image, a pre-processed image or a converted image.

The light sensor chip 11 includes a light sensor 111 and a processor (or referred to chip processor) 113. For example, the light sensor 111 and the processor 113 are arranged in the same encapsulation.

The light sensor 111 is, for example, a CCD image sensor, a CMOS image sensor or the like. The light sensor 111 includes a plurality of pixels arranged in a matrix. The light sensor 111 is used to detect, using a fixed or adjustable exposure time, light within a field of view FOV to output an image frame, e.g., a first image Im_raw. The light sensor 111 preferably has multiple amplifiers (e.g., programmable gain amplifier, PGA) for amplifying raw data outputted by the pixel array using a gain value. The light sensor 111 preferably has auto exposure mechanism.

The processor 113 is, for example, a digital signal processor (DSP) or application specific integrated circuit (ASIC). The processor 113 is electrically connected to the light sensor 111 to receive a first image Im_array, which is a raw data image or an amplified raw data image. The processor 113 identifies an operating mode (or ambient light intensity) according to an image parameter associated with the first image Im_raw, wherein the image parameter includes at least one of the image brightness, gain value, convergence time of auto exposure and image quality. The image parameter is calculated by the processor 113 using the first image Im_raw.

The processor 113 further includes a memory for storing thresholds associated with the above image parameter to be compared with a current image parameter, which is calculated by the processor 113 according to a current first image. The processor 113 identifies the intensity of ambient light according to a comparison result of comparing the current image parameter and the stored threshold to determine an operating mode. For example, when an average brightness value of the first image Im_raw is larger than a brightness threshold, when a gain value (analog gain and/or digital gain) for amplifying the first image Im_raw is smaller than a gain threshold, when an image quality of the first image Im_raw is larger than a quality threshold and/or a convergence time of auto exposure is smaller than a time threshold, the processor 113 identifies that the ambient light is strong enough and thus a strong light mode is entered; otherwise, a weak light mode is entered.

In the present disclosure, the processor 113 is further embedded or pre-stored with a learning model 115 that is implemented by a hardware circuit and/or software codes. The learning model 115 is generated, before the shipment of the image processing device 100, by a computer device and/or web platform running a data network architecture (e.g., including neural network learning algorithm, deep learning algorithm, but not limited to). The data network architecture uses a raw data image acquired by the light sensor 111 with the first exposure time to learn to generate a ground truth image, and generates the learning model 115 to be recorded in the image processing device 100. The learning model may be different corresponding to different light sensors.

Figure 5:
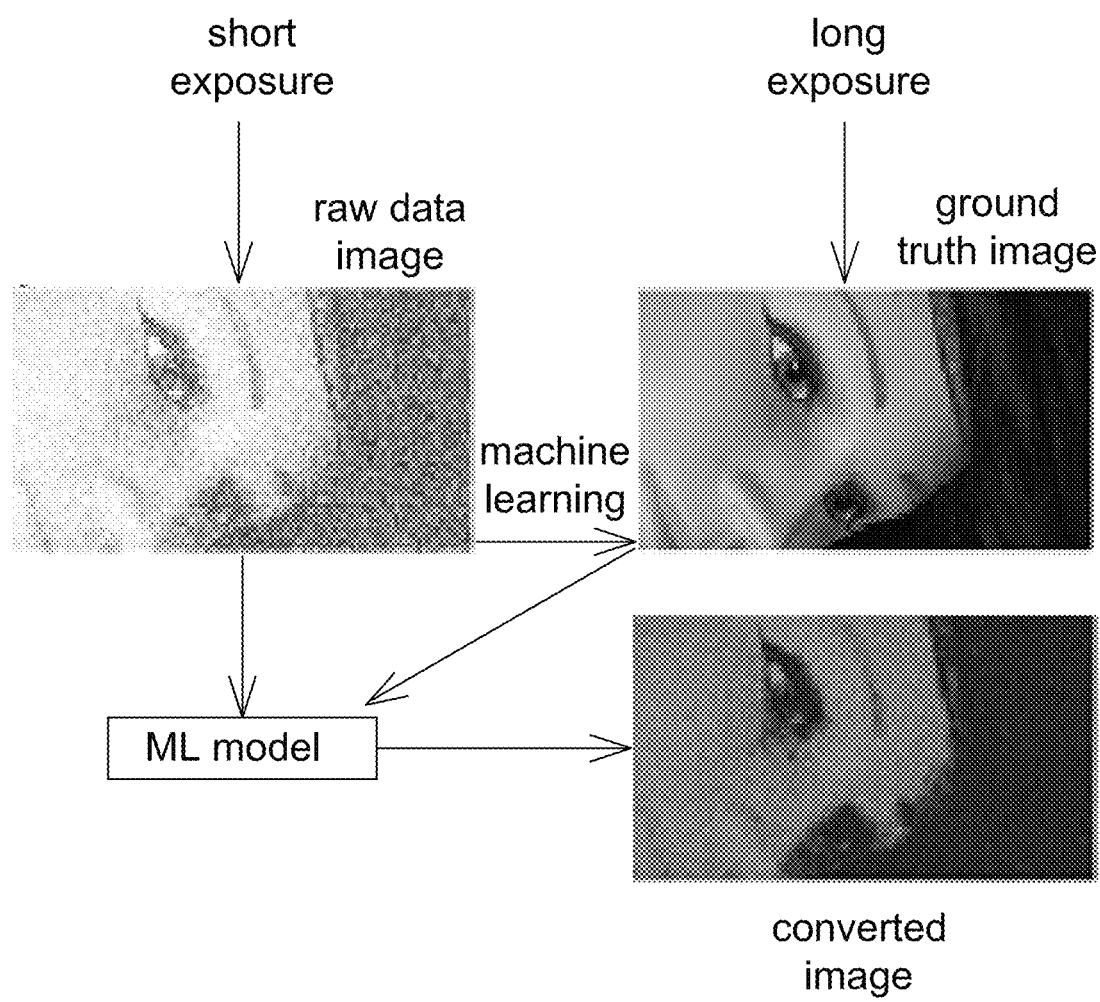
FIG. 5 is an operational schematic diagram of an image processing device according to one embodiment of the present disclosure.

For example referring to FIG. 5, the first exposure time is referred to, for example, an exposure time used by the light sensor 111 under a strong light environment, e.g., the first exposure time being referred to a short exposure. Accordingly, if this short exposure is also used in a weak light environment, the obtained raw data image has a poor image feature, e.g., the raw data image shown in FIG. 5.

In addition, for generating the machine learning model, before the shipment of the image processing device 100, the light sensor 111 acquires a ground truth image (not containing any image of a moving object) in a weak light environment using an exposure time, referred to a long exposure, longer than the first exposure time. As the long exposure is longer than the short exposure, the ground truth image has a better image feature, as shown in FIG. 5, than the raw data image. The long exposure is preferably selected as a time interval to cause the ground truth image to have an image feature higher than a feature threshold, e.g., selecting a maximum usable exposure time of the light sensor 111. More specifically, the image feature contained in the ground truth image is enough for performing the object identification correctly. The image feature includes, for example, the image quality, contrast, clarity or the like.

As mentioned above, after the light sensor 111 outputs the first image Im_raw, the processor 113 identifies an operating mode according to the associated image parameter. When identifying that the operating mode is a strong light mode, the processor 113 directly outputs the first image Im_raw to the electronic device 13. The processor 133 (or referred to device processor such as a microcontroller unit, a central processing unit, a graphic processing unit or the like) of the electronic device 13 performs the post-processing, e.g., identifying the gesture, distance, moving speed, moving direction, face and so on, according to at least one first image Im_raw. In some embodiments, the processor 113 performs the pre-processing such as the filtering, denoising and/or digitizing on the first image Im_raw to generate a pre-processed image Im_pre.

On the other hand, when identifying that the operating mode is a weak light mode, the processor 113 converts, using the pre-stored learning model 115, the first image Im_raw to a converted image Im_adj, and then outputs the converted image Im_adj to the electronic device 13. For example referring to FIG. 5, although the converted image Im_adj is shown not to have such a good image feature as the ground truth image, the converted image Im_adj has a higher image quality, contrast and clarity and has a lower blurring than the first image Im_raw such that the converted image Im_adj is suitable for the object identification.

More specifically, in the first embodiment, when the ambient light is strong enough (i.e. strong light mode), the light sensor chip 11 directly outputs a first image Im_raw to the electronic device 13 for the post-processing. Because the first image Im_raw captured in this condition has enough image features, the first image Im_raw is not converted by the learning model 115. However, when the ambient light is not enough (i.e. weak light mode), the light sensor chip 11 does not output the first image Im_raw but outputs a converted image Im_adj which is processed by the learning model 115. Accordingly, it is able to acquire valid images (not containing blurred object image) without extending the exposure time, and a high frame rate is maintained under weak illumination.

Figure 4:
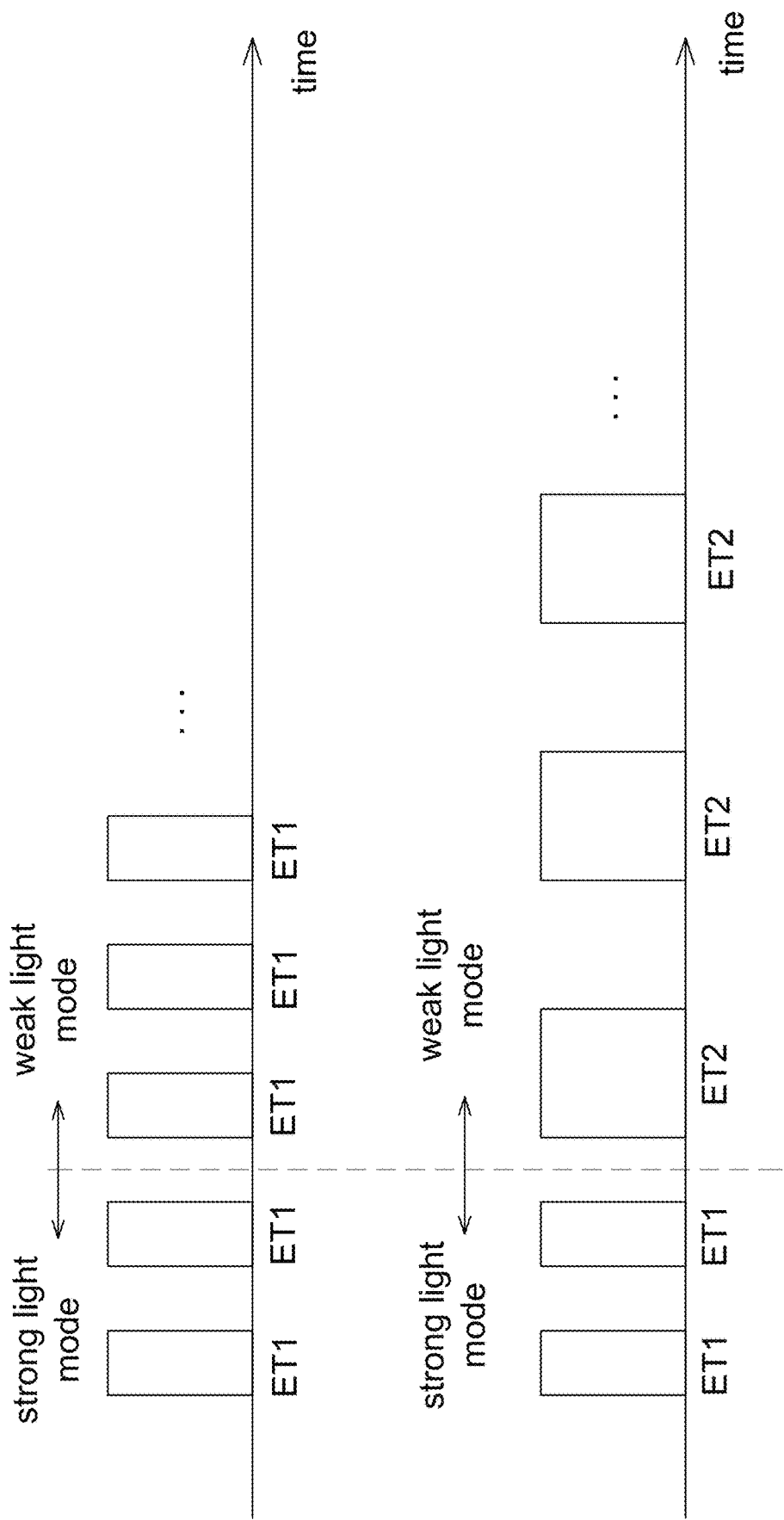
FIG. 4 is a schematic diagram of the exposure times of an image processing device according to some embodiments of the present disclosure.

Referring to FIG. 4, in the first embodiment, the processor 113 further selects to control the light sensor 111 to detect light within the FOV using a second exposure time ET2 to output a second image in the weak light mode, wherein the second exposure time ET2 is longer than the first exposure time ET1. To avoid the problems in the traditional image capturing device, when a blurring of the second image is higher than a predetermined blurring threshold, the processor 113 controls the light sensor 111 to shorten the second exposure time to prevent from acquiring blurred images. Similarly, in the weak light mode, the processor 113 uses the pre-stored learning model 115 to convert the second image into another converted image, and then outputs said another converted image. The processor 133 of the electronic device 13 performs the object identification according to at least one said another converted image.

For example, when identifying that the image feature of the converted image Im_adj is lower than a predetermined feature threshold, the processor 133 informs the light sensor chip 11 to acquire image frames using a longer exposure time, e.g., the second exposure time ET2.

Please referring to FIG. 2, it is a block diagram of an image processing device 200 according to a second embodiment of the present disclosure. The difference between the image processing device 200 and the image processing device 100 of the first embodiment is that the learning model 235 is arranged in the electronic device 23 instead of in the light sensor chip 21, but other parts are similar to the first embodiment.

The image processing device 200 includes a light sensor chip 21 and an electronic device 23. The light sensor chip 21 may also be arranged in or outside the electronic device 23 according to different applications. In the aspect that the light sensor chip 21 is arranged in the electronic device 23, the learning model 235 is executed by an external processor (e.g., processor 233) of the light sensor chip 21.

The light sensor chip 21 also includes a light sensor 211 (identical to the light sensor 111) and a processor 213 (identical to the processor 113), only the processor 213 does not have the learning model 235. The light sensor 211 of the light sensor chip 21 is also used to detect light within a field of view FOV using a first exposure time to output a first image Im_raw. According to different applications, the processor 213 directly outputs the first image Im_raw, or performs a pre-processing (e.g., filtering, denoising and/or digitizing) to output a pre-processed image Im_pre to the electronic device 23.

The electronic device 23 is coupled (wired or wirelessly) to the light sensor chip 21 to receive the first image Im_raw or the pre-processed image Im_pre. The electronic device 233 further includes a processor 233 (or referred to device processor such as CPU, MCU or GPU) used to identify an operating mode according to an image parameter associated with the first image Im_raw. As mentioned above, the image parameter includes at least one of the image brightness, gain value, convergence time of auto exposure and image quality. The method of identifying an operating mode has been illustrated in the first embodiment, and thus details thereof are not repeated herein.

When identifying that the operating mode is a strong light mode, the processor 233 uses the first image Im_raw (or pre-processed image Im_pre) to perform an object identification. When identifying that the operating mode is a weak light mode, the processor 233 converts, using embedded or pre-stored learning model 235, the first image Im_raw (or pre-processed image Im_pre) into a converted image Im_adj at first, and then use the converted image Im_adj to perform the object identification. It should be mentioned that although FIG. 2 shows that the learning model 235 is outside of the processor 233, it is only intended to illustrate but not to limit the present disclosure. The learning model 235 is included in the processor 233 and implemented by a hardware circuit and/or software codes.

In the second embodiment, the image quality, contrast and clarity of the converted image Im_adj are higher than those of the first image Im_raw, or the blurring of the converted image Im_adj is lower than that of the first image Im_raw such that the object identification is performed correctly in a low light environment and using a short exposure time, and this effect cannot be achieved using conventional image capturing devices.

In the second embodiment, the learning model 235 is generated, before the shipment of the image processing device 200, by a computer device and/or web platform running data network architecture. The data network architecture uses a raw data image acquired by the light sensor chip 21 with the first exposure time to learn to generate a ground truth image, and generates the learning model 235 to be recorded in the image processing device 200. As mentioned above, the ground truth image is acquired by the light sensor chip 21 using an exposure time longer than the first exposure time (e.g. a selectable longest exposure time of the light sensor 211), and has image features higher than a feature threshold, for example referring to FIG. 5.

More specifically, in the second embodiment, the light sensor chip 21 is used to output a raw data image (i.e. the first image Im_raw) or a pre-processed raw data image (i.e. the pre-processed image Im_pre). After identifying the intensity of ambient light, the electronic device 23 then determines whether to perform an object identifying according to the raw data image, or to convert the raw data image to a converted image at first and then perform the object identifying according to the converted image. That is, in the weak light mode the processor 233 does not use the first image Im_raw to perform the object identification.

Similarly, the processor 233 of the electronic device 23 further controls the light sensor chip 21 to detect light using a second exposure time (e.g., while the first image or converted image having poor image feature) and output a second image, referring to FIG. 4, wherein the second exposure time ET2 is longer than the first exposure time ET1. The processor 233 uses the pre-stored learning model 235 to convert the second image into another converted image, and use said another converted image to perform the object identification.

The processor 233 further adjusts the second exposure time according to a comparison result of comparing the blurring of the second image with a blurring threshold, e.g., shortening the second exposure time while the blurring of the second image is higher than the blurring threshold.

Referring to FIG. 3, it is a flow chart of an operating method of an image processing device according to one embodiment of the present disclosure, wherein the method is adaptable to the image processing device of the first embodiment in FIG. 1 and the second embodiment in FIG. 2. Details of this operating method are illustrated below using an example.

Firstly, a light sensor (111 or 211) uses a first exposure time to detect light and output a first image Im_raw. In one aspect, the first exposure time is an exposure time used under strong light environment, e.g., the shortest exposure time of the light sensor. In another aspect, the light sensor has only one fixed exposure time.

Next, a processor (e.g., 113 or 233) compares an image parameter associated with the first image Im_raw with a parameter threshold, Step S31. As mentioned above, the image parameter is a proper parameter for identifying the intensity of ambient light, e.g., including at least one of the image brightness, gain value, convergence time of auto exposure and image quality. The image parameter is previously stored in a memory of the device.

When the image parameter exceeds the parameter threshold, a strong light mode is entered, Step S32. For example, if the image brightness and image quality are larger, it means that the ambient light is stronger; whereas, if the gain value and convergence time of auto exposure are smaller, it means that the ambient light is stronger, and a proper threshold is selected accordingly. That is, the exceeding is referred to the image brightness or the image quality being larger than an associated threshold, and the gain value or the convergence time being smaller than an associated threshold. Meanwhile, the processor (133 or 233) directly uses the first image Im_raw to perform the object identification, e.g., including the object tracking, depth identification, face recognition and so on.

When the image parameter does not exceed the parameter threshold, a weak light mode is entered, e.g., Step S33. Meanwhile, the processor (133 or 233) uses a pre-stored learning model (115 or 235) to convert the first image Im_raw into a converted image Im_adj, and then uses the converted image Im_adj to perform the post-processing such as the object identification, Step S34.

The method of generating the learning model has been illustrated above, e.g., referring to FIG. 5, and thus details thereof are not repeated herein. As the converted image Im_adj is generated for improving the identification accuracy, the image quality, contrast or clarity of the converted image Im_adj is higher than that of the first image Im_raw, or the blurring of the converted image Im_adj is lower than that of the first image Im_raw. More specifically speaking, in this aspect, the first image Im_raw is considered not having enough image features in the weak light environment, and thus the first image Im_raw is not used to perform the object identification.

However, when the image feature of the first image Im_raw is too low (e.g., lower than a predetermined threshold), the light sensor (111 or 211) is further controlled to detect light using a second exposure time to output a second image, wherein the second exposure time is longer than the first exposure time, Step S331-S332. The processor (113 or 233) uses the pre-stored learning model (115 or 235) to convert the second image into another converted image, and then uses said another converted image to perform the object identification. It should be mentioned that, steps S331-S332 are not necessary to be implemented.

The effect of the present disclosure is illustrated below. When a fixed exposure time is used, the frame rate of image frames outputted by a light sensor is not decreased under low illumination such that correct operation is performed even in the high relative speed scenario. When the present disclosure is applied to a gesture recognition device, the gesture recognition device is arranged to be connected to a display to control a cursor movement thereon in some applications. In the low light environment, as the exposure time is not extended significantly, the cursor trace shown on the display is not broken (due to losing object image) even in the high relative speed scenario. When the present disclosure is applied to a face recognition device, the face recognition device is arranged to output a trigger signal to indicate a face image being recognized in some applications. In the low light environment, as the exposure time is not extended significantly, even though the target to be recognized is moving, a condition that the trigger signal unable to be generated does not occur.

As mentioned above, the conventional image capturing device extends the exposure time in a low light environment to capture enough image features for the object identification. However, in detecting a moving object, the long exposure time can cause another problem such as object image blurring or unable to capture any object image. Accordingly, the present disclosure provides an image processing device (e.g., FIGS. 1 to 2) and an operating method thereof (e.g., FIG. 3) that maintain the same exposure time even in a low light environment to avoid the problem of acquiring invalid images. Meanwhile, an image acquired using a short exposure time is converted to increase the image feature using a machine learning algorithm to achieve the effect of accurately performing the object identification event in the low light environment.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A light sensor chip, comprising:
a light sensor, configured to detect light using a first exposure time to generate a first image in a first operating mode; and
a processor, electrically coupled to the light sensor, and configured to
control the light sensor to detect light using a second exposure time, longer than the first exposure time, to generate a second image in a second operating mode, wherein the processor is configured to determine the first operating mode or the second operating mode according to an image parameter of the first image, and the image parameter comprises an image quality, and at least one of an image brightness, a gain value, and a convergence time of auto exposure, and convert, using a pre-stored learning model, the second image into a converted image.

2. The light sensor chip as claimed in claim 1, wherein the pre-stored learning model is trained by a data network architecture based on a ground truth image.

3. The light sensor chip as claimed in claim 1, wherein
an image quality, a contrast or a clarity of the converted image is higher than that of the first image, or
a blurring of the converted image is lower than that of the first image.

4. The light sensor chip as claimed in claim 1, wherein the processor is further configured to output the converted image instead of outputting the first image in the second operating mode.

5. The light sensor chip as claimed in claim 1, wherein when a blurring of the second image is higher than a blurring threshold, the processor is further configured to shorten the second exposure time to acquire another second image, which is then converted by the pre-stored learning model into another converted image.

6. An image processing device, comprising:
a light sensor chip, configured to detect light using a first exposure time to output a first image in a first operating mode; and
an electronic device, coupled to the light sensor chip to receive the first image, and configured to
post-process the first image in the first operating mode,
control the light sensor chip to detect light using a second exposure time, longer than the first exposure time, to output a second image in a second operating mode, wherein the electronic device is configured to determine the first operating mode or the second operating mode according to an image parameter of the first image, and the image parameter comprises an image quality, and at least one of an image brightness, a gain value, and a convergence time of auto exposure, and
convert, using a pre-stored learning model, the second image into a converted image, and then post-process the converted image in the second operating mode.

7. The image processing device as claimed in claim 6, wherein the learning model is trained by a data network architecture based on a ground truth image.

8. The image processing device as claimed in claim 6, wherein
an image quality, a contrast or a clarity of the converted image is higher than that of the first image, or
a blurring of the converted image is lower than that of the first image.

9. The image processing device as claimed in claim 6, wherein the electronic device is configured not to post-process the first image in the second operating mode.

10. The image processing device as claimed in claim 6, wherein when a blurring of the second image is higher than a blur threshold, the electronic device is further configured to control the light sensor chip to shorten the second exposure time to acquire another second image, which is then converted by the pre-stored learning model into another converted image.

11. A light sensor chip, comprising:
a light sensor, configured to detect light using a first exposure time to generate a first image in a first operating mode; and
a processor, electrically coupled to the light sensor, and configured to
convert the first image into a converted image using a pre-stored learning model, and then output the converted image in the first operating mode,
control the light sensor to detect light using a second exposure time, longer than the first exposure time, to generate a second image in a second operating mode, wherein the processor is configured to determine the first operating mode or the second operating mode according to an image parameter of the first image, and the image parameter comprises an image quality, and at least one of an image brightness, a gain value and a convergence time of auto exposure, and
convert, using the pre-stored learning model, the second image into another converted image, and then output the another converted image in the second operating mode.

12. The light sensor chip as claimed in claim 11, wherein the learning model is trained by a data network architecture based on a ground truth image.

13. The light sensor chip as claimed in claim 11, wherein
an image quality, a contrast or a clarity of the converted image is higher than that of the first image, or
a blurring of the converted image is lower than that of the first image.

14. The light sensor chip as claimed in claim 11, wherein the processor is configured not to output the converted image in the second operating mode.

15. The light sensor chip as claimed in claim 11, wherein when a blurring of the second image is higher than a blur threshold, the processor is further configured to shorten the second exposure time to acquire another second image, which is then converted by the pre-stored learning model into another converted image.

* * * * *